United States Patent
Süss et al.

(10) Patent No.: US 12,459,180 B2
(45) Date of Patent: Nov. 4, 2025

(54) OPTIMIZED INJECTION MOLD PLATE, AND INJECTION MOLD COMPRISING SAME

(71) Applicant: MHT Mold & Hotrunner Technology AG, Hochheim (DE)

(72) Inventors: Peter Süss, Messel (DE); Christian Tilsner, Weiterstadt (DE); Christian Wagner, Mainz (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 149 days.

(21) Appl. No.: 17/918,996

(22) PCT Filed: Apr. 13, 2021

(86) PCT No.: PCT/EP2021/059515
§ 371 (c)(1),
(2) Date: Oct. 14, 2022

(87) PCT Pub. No.: WO2021/209428
PCT Pub. Date: Oct. 21, 2021

(65) Prior Publication Data
US 2023/0063595 A1   Mar. 2, 2023

(30) Foreign Application Priority Data
Apr. 17, 2020 (DE) .................... 10 2020 110 565.7

(51) Int. Cl.
*B29C 45/42* (2006.01)
*B29C 45/26* (2006.01)
(Continued)

(52) U.S. Cl.
CPC ........ *B29C 45/4225* (2013.01); *B29C 45/261* (2013.01); *B29C 2045/7214* (2013.01); *B29K 2105/258* (2013.01); *B29K 2995/0094* (2013.01)

(58) Field of Classification Search
CPC .............. B29C 45/4225; B29C 45/261; B29C 2045/7214; B29C 45/17; B29C 45/03; B29K 2105/258; B29K 2995/0094
See application file for complete search history.

(56) References Cited

U.S. PATENT DOCUMENTS 4,126,291 A    11/1978 Gilbert et al.
9,956,708 B2 †  5/2018 Thoemmes
(Continued)

FOREIGN PATENT DOCUMENTS

DE    10 2010 018121 A1    10/2011
DE    10 2012 102 266 A1    9/2013
(Continued)

OTHER PUBLICATIONS

Kitayama, S., Tamada, K., Takano, M et al. Numerical and experimental investigation on process parameters optimization in plastic injection molding for weldlines reduction and clamping force minimization. Int J Adv Manuf Technol 97, 2087-2098 (2018). https://doi.org/10.1007/s00170-018-2021-y (Year: 2018).*

(Continued)

*Primary Examiner* — Alison L Hindenlang
*Assistant Examiner* — Erica Hartsell Funk
(74) *Attorney, Agent, or Firm* — Morgan, Lewis & Bockius LLP

(57) ABSTRACT

An injection moulding tool plate for use in an injection moulding tool for producing a plurality v of preforms having a plurality of handling elements arranged in columns and rows, wherein the distance r between adjacent handling (Continued)

Figure 1:
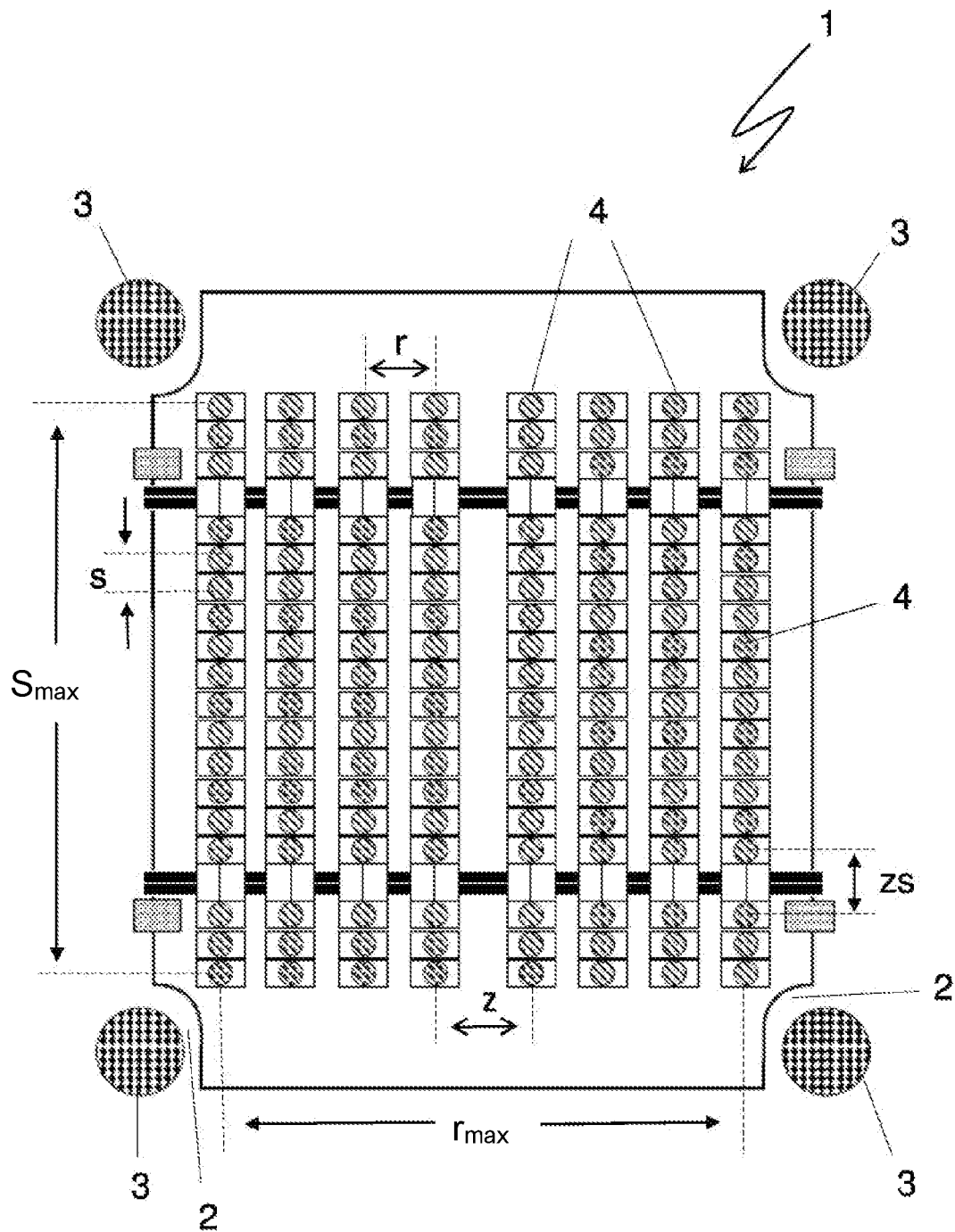

elements within the rows is greater than the distance s between adjacent handling elements within the columns, characterized in that the distance s is less than 50 mm.

13 Claims, 6 Drawing Sheets

(51) Int. Cl.
    *B29C 45/72*     (2006.01)
    *B29K 105/00*     (2006.01)

(56) References Cited

U.S. PATENT DOCUMENTS

| | | |
|---|---|---|
| 10,899,057 B2 † | 1/2021 | Bock |
| 2007/0001344 A1 | 1/2007 | Weinmann et al. |
| 2016/0244193 A1 | 8/2016 | Faltenbacher et al. |

FOREIGN PATENT DOCUMENTS

| | | | |
|---|---|---|---|
| DE | 10 2018 111 875 A1 | 11/2019 | |
| EP | 3569381 A1 | 11/2019 | |
| WO | 2009021317 A1 † | 2/2009 | |

OTHER PUBLICATIONS

International Preliminary Report on Patentability dated Oct. 13, 2022, issued in corresponding International Patent Application No. PCT/EP2021/059515.
International Search Report (with partial translation) and Written Opinion dated Jul. 6, 2021, issued in corresponding Intrnational Patent Application No. PCT/EP2021/059515.
"Mould Story", European Plastics News, EMAP Business Publication, London, GB, vol. 31, No. 10, Nov. 1, 2004, pp. 34-35, XP-001214228.
Search Report dated Dec. 15, 2020, issued in corresponding German Patent Application No. 10 2020 110 565.7.
PET Planet Insider, "Reduced Pitch, Increased Cavitation", vol. 20, No. 11/19, Nov. 4, 2019.
"Krones Acquires MHT for PET Tooling", Stretch Blow Molding, Published Dec. 12, 2018, https:// www.ptonline.com/news/krones-acquires-mhtfor-pet-tooling.
MHT Product Sheet, "Pet Molds", Published 2018 www.mht-ag.dom/products/pet-molds.html.
PET Planet Insider, vol. 11, No. 6.10, p. 19; MHT Mold & Hotrunner Technology AG, Jun. 21, 2010.
"MicropitchTM mold technology increases preform output", Press Release, Husky, Oct. 26, 2001 https://www.pressreleasefinder.com/Husky/HuskyNR30/en/.
Extended European Search Report (EP01) dated Jan. 31, 2025, issued in corresponding European Patent Application No. 24210093.1.
Extended European Search Report (EP02) dated Feb. 3, 2025, issued in corresponding European Patent Application No. 2421099.8.
Extended European Search Report (EP03) dated Feb. 4, 2025, issued in corresponding European Patent Application No. 24210089.9.
PET Planet, "Mould Making, a review", Oct. 29, 2019, XP093240359, https://petpla.net/2019/10/29/mould-making-a-review/.
"HyPET Preform Systems, Features & Options Booklet", Husky, Version 9.11—May 2011.
Obrist 28 PET Preform, Mineral Water Preforms, Jesper PET preform Co., XP093240845, Jun. 7, 2019, URL: https://web.archive.org/web/20190607174618/https://www.jesper-preform.com/en/product-508221/Obrist-28-Alaska-28-PET-Preform-PET-Obrist-28-Alaska-28-PET-Preform.html.
Obrist PET Preform, Mineral Water Preforms, Jesper PET preform Co., XP093240846, Sep. 6, 2019, URL: https://web.archive.org/web/20190906153601/https://www.jesper-preform.com/en/product-508219/Obrist-30-25-Alaska-30-25-PET-Preform-Obrist-30-25-Alaska-30-25-PET-Preform.html.
MHT, PET Preform Molds Brochure.
Netstal, PETline Technical Data brochure.
Specialty Plastics, "Foams (Urethane, Flexible, Rigid, PET & Preform Processing Techonology Handbook", Asia Pacific Business Press Inc. (Delhi, India), 2005, pp. 580-585.
Brandau, Ed., "Stretch blow molding", third edition, Elsevier (Oxford, UK) 2017, pp. 21-23 and 272.
"Hot Half Assembly (Assieme parte calda)", Thermodyne HotRunner Systems—SIPA Division, Jul. 2003.
PET Planet 2019.†
Plastics Technology.†
PET Molds.†
PET Planet 2010.†
Husky.†

\* cited by examiner
† cited by third party

OPTIMIZED INJECTION MOLD PLATE, AND INJECTION MOLD COMPRISING SAME

The present invention relates to an injection moulding tool plate for use in an injection moulding tool for producing preforms having a plurality of handling elements arranged in columns and rows, wherein the distance r between adjacent handling elements within the rows is greater than the distances between adjacent handling elements within the columns.

Injection moulding is one of the most important methods for the production of plastic moulded parts. Here, the moulding material, generally given originally as a powder or granule, is heated, plasticized, and pressed under high pressure into a corresponding moulding tool. The moulding material solidifies in the moulding tool and is then removed from the opened tool. For example, commercially available PET bottles are produced by stretch-blow moulding a hollow preform. The preform is produced in a first step by means of injection moulding. The stretch-blow moulding, which follows the injection moulding process, can occur either immediately after the preform has been produced or at a later time.

In the production of the corresponding injection moulding, there is a great deal of effort required, as the injection mould must on the one hand be designed for very high pressures and must on the other hand comprise heated and/or cooled channels. This is associated with high wear, requiring periodic refurbishment of the injection moulding tool plate or parts thereof, driving costs up.

While the present invention could in principle be used in injection moulding tools of any kind, it will be described below using an injection moulding tool for the production of PET preforms. Such injection moulding tools have a plurality of cavities, e.g. 96, into which suitably formed tool cores are inserted. When the tool is closed, i.e. when the core is inserted into the corresponding cavity, a space, the so-called moulding space, is formed between the core on the one hand and the cavity on the other hand. The plasticized material, i.e. PET in the example described herein, is then injected under high pressure into this space. As soon as the PET preform is sufficiently cooled, the mould can be opened and the preform can be removed. In order to reduce the cycle times, i.e. the time from one injection operation to the next injection operation, it is already common to remove the preform from the mould at a very early point in time when the preform is already solid on its outer surfaces, whereas the inner region is still liquid. In this state, the preform is generally transferred into a so-called removal plate comprising a set of receiving cavities. The set of receiving cavities comprises as many receiving cavities as the tool has cores and cavities, such that from each core, the solidified preform can be transferred into a receiving cavity.

In the production of preforms, the injection moulding tools comprise two tool halves that can be moved back and forth between an open position and a closed position. The one tool half comprises the so-called cavity plate, which has a plurality of cavities arranged in columns and rows, wherein the distance r between adjacent cavities within the rows is greater than the distance s between adjacent cavities within the columns. The other tool half comprises a core plate, which comprises corresponding cores that are arranged within the cavity in the closed state of the tool mould. Thus, the cores are also arranged in a plurality of columns and rows, wherein the distance r between adjacent cores within the rows is greater than the distance s between adjacent cores within the columns. Both the cores and the cavities are handling elements in the sense of the present invention. Handling elements are all elements that come into contact with or treat the preforms during their production or removal or subsequent cooling.

Typically, the plasticized PET melt is supplied via openings in the bottom of the cavities. In order to be able to supply the plasticized melt evenly to all the cavities, the cavity plate is assigned a corresponding hot channel network, which is typically arranged in a hot channel plate positioned next to the cavity plate. Because the sprue, i.e. the point at which the plasticized melt is supplied to the hot channel plate, is usually arranged in the centre of the plate, the hot channel network extends from the sprue to each cavity, wherein the channels become ever narrower the further away they are from the sprue. In the vicinity of the sprue, however, a portion of the hot channel will have a relatively large cross-portion, so that adjacent cavities cannot be placed too close next to one another.

Thus, in the described PET tool, a distance of about 140 mm is often maintained between the centre point of a cavity and the centre point of the immediately adjacent cavity in row direction. Unless otherwise described in the individual case, the distance between handling elements should always be understood to mean the distance between the centre point of one handling element and the centre point of the other handling element. In principle, it is desired to produce as many preforms as possible simultaneously with an injection moulding tool. Therefore, in addition to the tool having 96 cavities, there are now also tools having 128 cavities or even 144 cavities. Because the corresponding handling elements are arranged in or on injection moulding tool plates, an increase in the number of cavities results in a weakening of the injection moulding tool plate. In the known PET tools, the distance between handling elements within the columns is at least 50 mm. The distance between handling elements within the columns is preferably at least twice as high, because corresponding slider elements generally need to be placed between the columns for opening the neck rings forming the threads of the preform. As the number of cavities increases, the plates are selected larger. For example, a tool having 144 cavities is known, in which the distance between handling elements within the columns is 50 mm and the distance within the rows is 140 mm. Due to the size of the injection moulding tool plate, the hot channel, i.e. the channel through which the liquid melt is supplied, must also be selected to be correspondingly long.

Almost all plastics, in particular polyethylene terephthalate (PET), suffer thermal damage at high temperatures. Thermochemical cleavage of the molecules often occurs. The result is short-chain cleavage products. The proportion of cleavage products is generally dependent not only on the processing temperature, but also on the processing pressure and dwell time. Especially when using a hot channel system, this risk exists, in particular in case of long cycle times.

For example, heating and plasticizing PET will necessarily produce low amounts of acetaldehyde. This acetaldehyde can seep from the finished PET plastic, i.e. the PET bottle, into the held liquid. Acetaldehyde is generally harmless to health at typical concentrations here, especially because acetaldehyde is also a natural component of fruit. However, the acetaldehyde has an odour that is usually not desired when consuming the liquid stored in the PET bottle. Particularly when mineral water is bottled in PET bottles, the consumer and thus the bottle manufacturer accept only a very low concentration of acetaldehyde.

However, the concentration of acetaldehyde in PET depends on a variety of different factors. For example, not only the quality of the granule used plays a role, but also the pressure and temperature conditions within the worm conveyor, the hot channel, and the actual moulding tool, for example. In total, there are dozens of parameters that have an impact on the processability of the melt and thus also on the proportion of cleavage products. In principle, the temperature, pressure, and dwell time of the plasticized melt in the worm conveyor, hot channel, and moulding tool, among other things, must be kept in a processing window, depending on the granule used, in order to ensure the processability of the melt and to avoid harm. Within the processing window, the parameters can be varied with no evidence thus far of a significant degradation in processability. However, this variation may very well affect the proportion of cleavage products. Thus, the parameters need to be optimized in order to keep the acetaldehyde concentration low.

It has been shown that the acetaldehyde concentration is surprisingly greater in preforms produced with a tool having 144 cavities than in preforms produced with a tool having 72 cavities.

Proceeding from the described prior art, it is therefore the problem of the present invention to pro-vide an injection moulding tool and an injection moulding tool plate, respectively, which can produce a high number of preforms in one cycle, where the acetaldehyde concentration can nevertheless be kept low.

According to the invention, this problem is solved in that the distance s is less than 50 mm.

At the known distances of 50 mm and greater, there can be significant pressure differentials in the plasticized melt between adjacent handling elements within a column. In addition, small temperature differences of the plasticized melt occur in adjacent handling elements within a column.

All of this is reduced by the smaller distance. In addition, the dwell time of the plasticized melt in the hot channel is reduced, because the length of the hot channel can be shortened.

The best findings have been made with a distance value of between 44 and 46 mm. Shorter distances than this do not result in a significant improvement.

While the reduction of the clearance of the handling elements within the columns will result in difficulties during assembly of the handling elements on the injection moulding tool plate, the arrangement will however result in 5 mm length savings per distance between adjacent handling elements within the columns. If, for example, in a 144× tool, i.e. a tool having 144 cavities, a total of 18 handling elements are arranged in one column, the measure according to the invention results in a reduction in the length of the injection moulding tool plate by at least 90 mm.

In a further preferred embodiment, it is provided that the distance r, i.e. the distance between adjacent handling elements within the rows, is less than 140 mm, preferably less than 120 mm, and most preferably between 110 and 115 mm. This measure also results in a more compact arrangement of the individual handling elements, which reduces the disadvantages described.

In a further preferred embodiment, it is provided that the ratio r/s is between 2.4 and 2.8, and preferably between 2.4 and 2.5.

It has been shown that the injection moulding tool plates will bend slightly. This bending becomes greater as the plate becomes longer. This has an impact on the handling elements. Essentially, the effects are determined by the distance between the handling elements. The smaller the distance between the handling elements, the less a bending of the tool plate will have a variety of effects on adjacent handling elements. Thus, the handling elements should have distances within the rows that are less than 2.8 times the distances within the columns, because otherwise, as a result of bending of the plates, there will be mismatches between the individual handling elements and the elements with which they cooperate.

In a further preferred embodiment, it is provided that a row of handling elements is formed by two row groups of handling elements, wherein for the distance z between the row groups of handling elements, the following equation is valid:

$$z = r\left(1 + \frac{a}{n}\right),$$

wherein r is the distance of the handling elements within a row group, and $$n, a \in IN \text{ with } n > 1,$$

wherein preferably a=1.

N is the quantity of the natural numbers (1,2,3 . . . ). By dividing the handling elements into two row groups, they can be arranged on either side of the sprue, such that within the row groups the distance between the handling elements can be reduced, while the distance z between the handling element of the first row group, which is closest to the second row group, and the handling element of the second row group, which is closest to the first row group of handling elements, is selected so as to be larger.

Typically, it is expedient for a<n and preferably n<5 and most preferably n=3.

In a preferred embodiment, it is provided that each row group comprises exactly four handling elements. For example, the distance between handling elements within the row group could be 110 mm, while the distance between the two closest handling elements of the two different row groups is 148 mm (1+⅓)×111 mm.

In a further preferred embodiment, it is provided that a column of handling elements is formed by two or three column groups of handling elements, wherein, for the distance zs between the column groups of handling elements, the following equation is valid: zs≥2s, wherein zs stands for the distance of the handling elements within a column group In a preferred embodiment, zs is 95 mm.

Although the distances between adjacent handling elements of different column groups can be greater than the distance between adjacent handling elements within a column group, it is advantageous in a preferred embodiment when the average distances between all adjacent handling elements within the columns is less than 50 mm.

Likewise, in a preferred embodiment, it is advantageous when the average distance f between all adjacent handling elements within the rows is less than 120 mm.

The handling elements engage with handling elements of adjacent injection moulding tool plates. Thus, handling elements typically have corresponding centring surfaces, such as conical portions, that contribute to an exact orientation of the injection moulding tool plate to an adjacent injection moulding tool plate.

If the average distance of the handling elements is selected too large, there may be a bending of the injection moulding tool plate.

The handling elements are typically not evenly distributed over the injection moulding tool plate. For example, there are usually peripheral regions of the plate in which no handling elements are arranged. A corresponding, snug alignment of an injection moulding tool plate to the adjacent injection moulding tool plate is therefore decisive only in the region in which handling elements are arranged. This region is hereinafter referred to as the work surface. All handling elements are then arranged either on the work surface or at least on the boundary of the work surface. For example, if the handling elements are arranged on a rectangular work surface in rows and columns, the surface content F of the work surface results from the distance $r_{max}$ between the furthest spaced apart handling elements of a row multiplied by the distance $s_{max}$ between the furthest spaced apart handling elements of a column.

In a preferred embodiment, the ratio of the number t of the handling elements to the surface content $$F \text{ is:} \frac{t}{F} > 175/m^2 \text{ and preferably } \frac{t}{F} > 190/m^2..$$

Furthermore, it is advantageous when a column comprises three column groups, wherein two column groups each comprise exactly four handling elements and one column group comprises exactly five handling elements, wherein the column group having exactly five handling elements is preferably arranged between the two column groups having exactly four handling elements each. Due to this division of the handling elements, the flow paths are minimized and the force distribution is uniform.

In a further preferred embodiment, it is provided that the ratio of the distance $r_{max}$ between the furthest spaced apart handling elements of a row to the distance $s_{max}$ between the furthest spaced apart handling elements of a column is between 0.9 and 1.1, preferably between 0.93 and 1.07, and most preferably between 1 and 1.06.

It has been shown that, when selecting this ratio, the force distribution within the tool plate is more homogeneous.

In a further preferred embodiment, it is provided that the injection moulding tool plate comprises a substantially rectangular mould, wherein recesses provided in the corner regions of the injection moulding tool plate for receiving frame members of an injection moulding machine. These recesses can be, for example, laterally open cutouts in the tool plate or through-holes.

In a further preferred embodiment, it is provided that the handling elements are cavities or cores, whose inner or outer contour corresponds to the outer or inner contour, respectively, of a preform to be produced.

With respect to the injection moulding tool for the production of preforms, the problem mentioned at the outset is solved in that the injection moulding tool comprises an injection moulding tool plate of the type described above, which is configured as a core plate, and a further injection moulding tool plate of the type described above, which is configured as a cavity plate, wherein the cavity plate and the core plate are movable relative to one another back and forth between a closed position and an open position, wherein, in the closed position, the handling elements of the core plate configured as cores are inserted into the handling elements of the cavity plate configured as cavities, whereby moulding spaces are formed between cores on the one hand and cavities on the other hand, whose inner contour corresponds to the outer contour of the preforms to be produced.

Furthermore, the injection moulding tool comprises a removal plate for removing preforms from the core plate, wherein the removal plate preferably comprises receiving sleeves, wherein the removal plate can be moved back and forth between an outer position in which the removal plate is not arranged between the cavity plate and the core plate and at least two removal positions in which the removal plate is arranged between the cavity plate and the core plate, and an injection moulding tool plate configured as an after-treatment plate of the aforementioned type, wherein, in the after-treatment plate, the handling elements are removal elements, preferably removal pins, for removing the preforms from the removal plate.

In a preferred embodiment, the injection moulding tool is housed in an injection moulding machine having four frame members arranged on four vertices of a rectangle, wherein the core plate and the cavity plate, and preferably also the handling elements provided thereon, are arranged between the four frame members.

Here, it is advantageous when the clearance between two frame members arranged on adjacent vertices of the rectangle is less than 1,000 mm, and at least 136, preferably at least 144, handling elements are arranged on the core plate as well as on the cavity plate.

In an alternative embodiment, it is advantageous when the clearance between two frame members arranged on adjacent vertices of the rectangle is less than 800 mm, and at least 120, preferably at least 128, handling elements are arranged on the core plate as well as on the cavity plate.

In an alternative embodiment, it is advantageous when the clearance between two frame members arranged on adjacent vertices of the rectangle is less than 750 mm, and at least 88, preferably at least 96, handling elements are arranged on the core plate as well as on the cavity plate.

The high number of handling elements on the work surface minimizes the forces exerted by the injection moulding tool plates on one another, because each individual handling element performs a centring function. Thus, in a preferred embodiment, the injection moulding tool plate can be operated with an injection moulding machine that applies a significantly lower closing force on the injection moulding tool plates and thus on the handling elements. For example, in a preferred embodiment, it is provided that a closing force of less than 30 kN per preform to be produced simultaneously is applied to the injection moulding plates.

In a preferred embodiment, however, a closing force of greater than 20 kN per preform to be produced simultaneously is applied to the injection moulding plates.

This is associated with a whole range of advantages. In principle, the closing force must be sufficient in order to hold the injection moulding tool during the moulding process. If the closing force is too low, the tool opens, i.e. the injection moulding tool plates move apart or open during the injection and/or compression phases, which can result in a ridge formation on the preform. The closing force therefore must not be selected too low. However, energy is saved by a low closing force. Tool wear is also lower.

Figure 2:
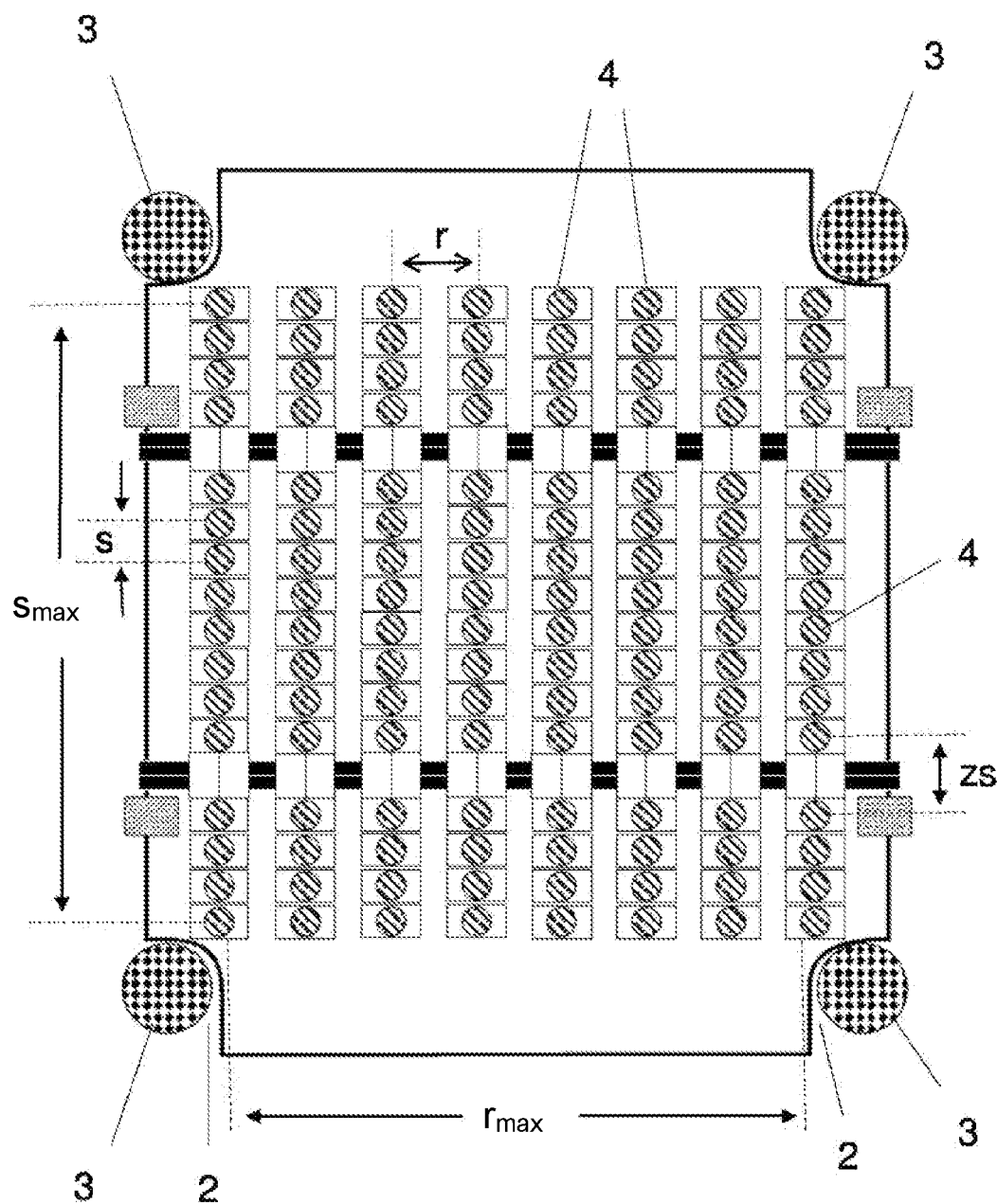
Figure 3:
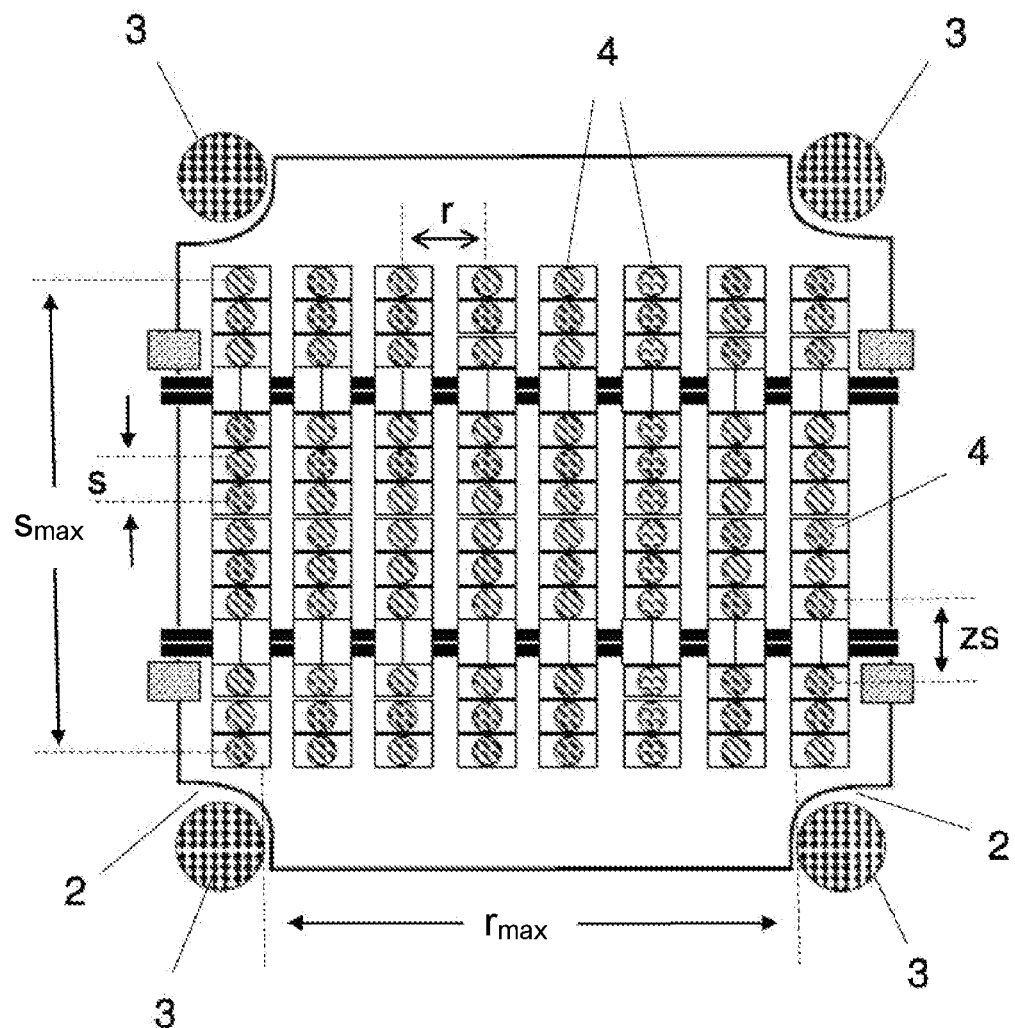
Figure 4:
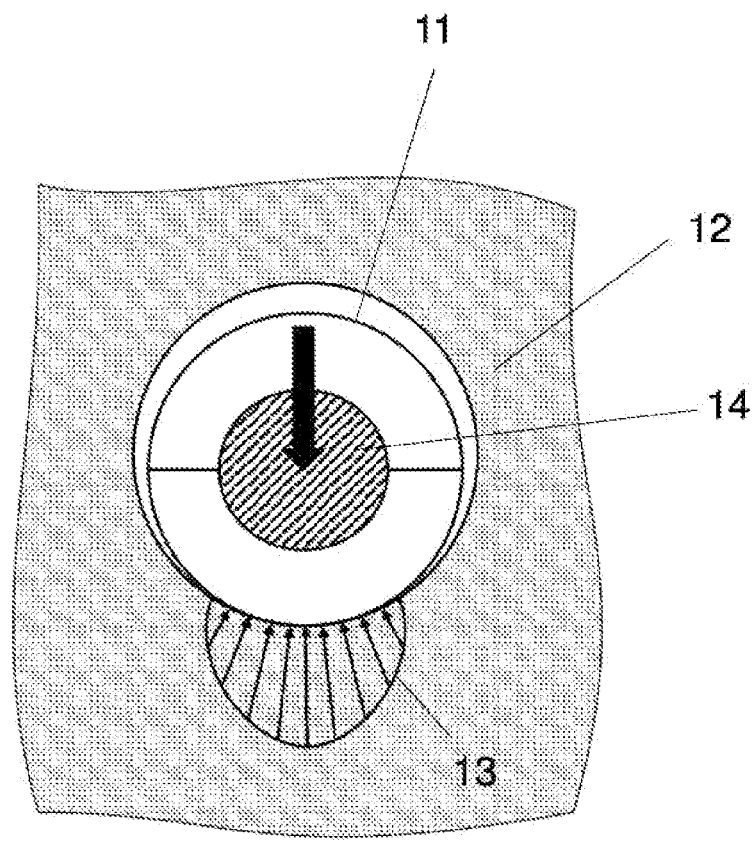
Figure 5:
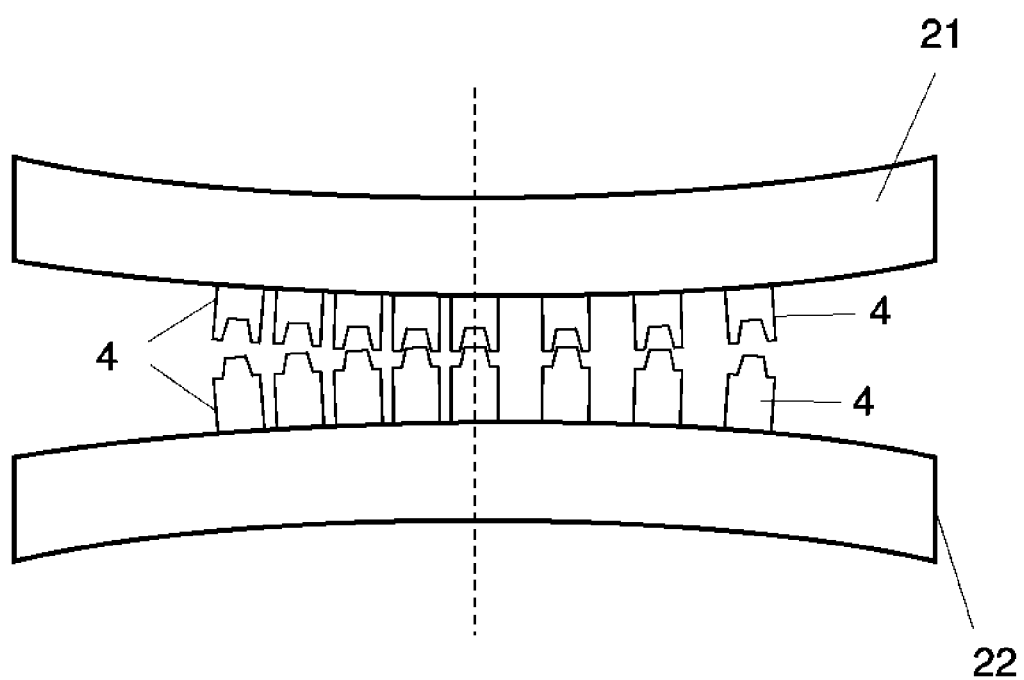
Figure 6:
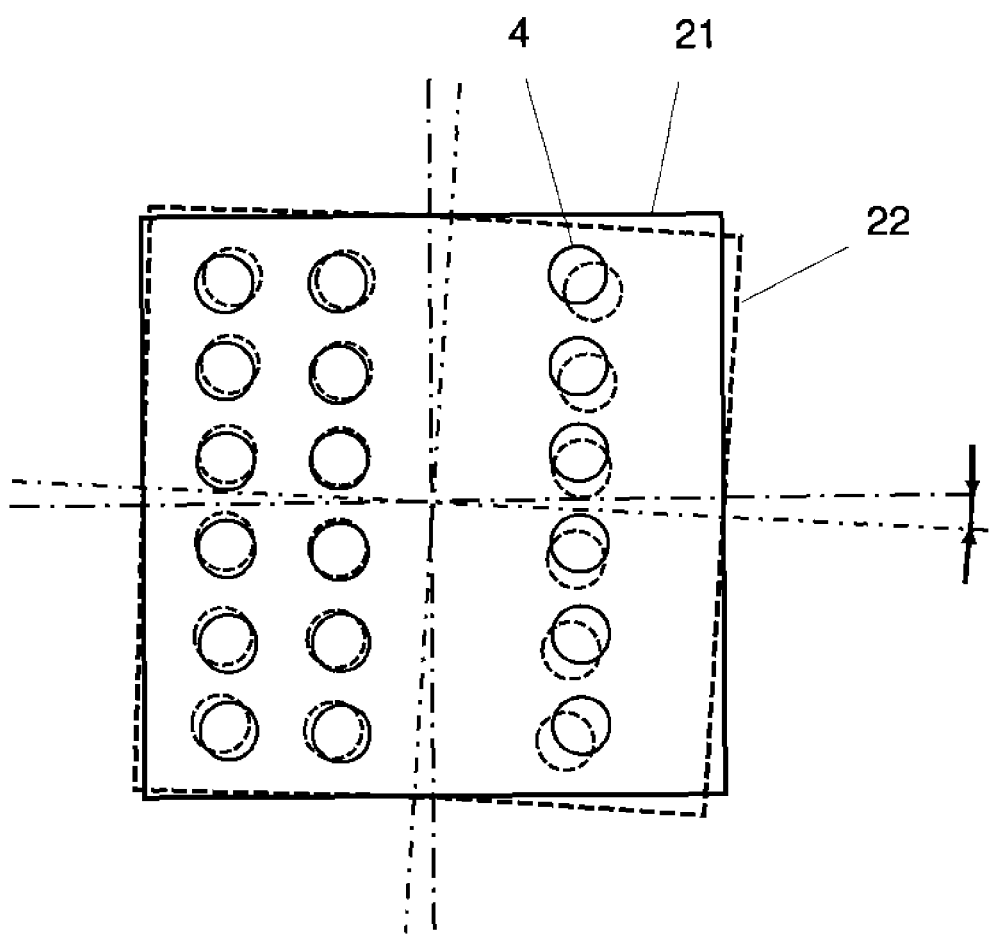

Further advantages, features, and possible applications of the present invention will become apparent from the following description of preferred embodiments. Here:

FIG. 1 shows a schematic view of a first tool plate according to the invention,

FIG. 2 shows a schematic view of a second tool plate according to the invention, FIG. 3 shows a schematic view of a third tool plate according to the invention, FIG. 4 shows a schematic view of the pressure ratios between the handling elements, FIG. 5 shows a schematic view of the distances upon a bending of the tool plates, and FIG. 6 shows a schematic view of the situation upon a tilting of the tool plates.

FIG. 1 shows a schematic view of a first tool plate 1 according to the invention. The tool plate 1 comprises a substantially rectangular mould having recesses 2 in the corner regions. These recesses serve to create space for frame members 3 of an injection moulding machine. The frame members 3 are not part of the injection moulding tool plate, but are still shown in FIG. 1.

The injection moulding tool plate 1 comprises a plurality, namely 144, of handling elements, which are depicted as circles. The handling elements 4 are arranged in rows, which are depicted horizon-tally in the figure, and in columns, which are depicted perpendicularly in the figure. Within the columns, the handling elements 4 have a distance s from one another, which is 45 mm in the embodiment shown. Within the rows, the distance between the handling elements 4 is designated r and is 111 mm in the embodiment shown.

A total of eight handling elements 4 are arranged in one row. In the embodiment shown, the eight handling elements 4 are formed in one row by two row groups consisting of four handling elements 4 each. Between the two row groups, the distance z is greater than the distance within the row groups. In the embodiment shown, the distance z is 148 mm.

The distance between the two outer handling elements 4 of one row is designated $r_{max}$ in the drawing and is 814 mm in the embodiment shown.

In column direction, three column groups are provided, each consisting of a plurality of handling elements 4. Two column groups, namely the column group shown in the figure at the top and bottom, each comprise exactly three handling elements, while the middle column group comprises twelve handling elements. Because the distance between adjacent handling elements within the column groups is equal and is 45 mm for each, the distance between adjacent column groups zs is at least twice as large. In the embodiment shown, it is 50 mm larger than the distance between adjacent handling elements within the column groups, i.e. it is 95 mm in total. This results in a distance of 865 mm between the two outermost handling elements 4 of a column, which is designated as $s_{max}$ in the drawing.

In FIG. 2, a second embodiment of a tool plate is shown. This embodiment comprises only 128 handling elements arranged in 8 columns and 16 rows. The rows here comprise only one row group of handling elements. In column direction, three column groups are provided, each consisting of a plurality of handling elements 4. Two column groups, namely the column groups shown in FIG. 2 at the top and bottom, each comprise exactly four handling elements, while the middle column group comprises eight handling elements.

The distance between the two outer handling elements 4 of one row is designated $r_{max}$ in the drawing and is 777 mm in the embodiment shown.

In column direction, three column groups are provided, each consisting of a plurality of handling elements 4. Two column groups, namely the column group shown in the figure at the top and bottom, each comprise exactly three handling elements, while the middle column group comprises twelve handling elements. Because the distance between adjacent handling elements within the column groups is equal and is 45 mm for each, the distance between adjacent column groups zs is at least twice as large. In the embodiment shown, it is 50 mm larger than the distance between adjacent handling elements within the column groups, i.e. it is 95 mm in total. This results in a distance of 775 mm between the two outermost handling elements 4 of a column, which is designated as $s_{max}$ in the drawing.

In FIG. 3, a third embodiment of a tool plate is shown. This embodiment comprises only 96 handling elements arranged in 8 columns and 12 rows. The rows here comprise only one row group of handling elements. In column direction, in each case three column groups are provided, each consisting of a plurality of handling elements 4. Two column groups, namely the column groups shown in FIG. 3 at the top and bottom, each comprise exactly three handling elements, while the middle column group comprises six handling elements.

The distance between the two outer handling elements 4 of one row is designated $r_{max}$ in the drawing and is 777 mm in the embodiment shown.

In column direction, three column groups are provided, each consisting of a plurality of handling elements 4. Two column groups, namely the column group shown in the figure at the top and bottom, each comprise exactly three handling elements, while the middle column group comprises twelve handling elements. Because the distance between adjacent handling elements within the column groups is equal and is 45 mm for each, the distance between adjacent column groups zs is at least twice as large. In the embodiment shown, it is 50 mm larger than the distance between adjacent handling elements within the column groups, i.e. it is 95 mm in total. This results in a distance of 595 mm between the two outermost handling elements 4 of a column, which is designated as $s_{max}$ in the drawing.

In FIG. 4, the pressure ratios between handling elements of adjacent injection moulding tool plates are shown. If an injection moulding tool plate comprises a neck ring 11 and a core 14 and the adjacent injection moulding tool plate comprises a cavity 12 into which the core 14 penetrates in order to form the moulding space and the two tool plates are displaced in the direction of the arrows, then, upon closing of the injection moulding tool, the centring of the handling elements takes place via conical portions of the neck ring 11 and cavity that are configured so as to correspond to one another. Due to the offset (shown by the arrow), the conical portions will always meet at the same point, and there is increased compression in a region 13.

Due to the measures according to the invention, the offset can be significantly reduced so that wear can be reduced.

FIG. 5 shows a schematic view of two injection moulding tool plates 21, 22 arranged adjacent to one another. Both injection moulding tool plates 21, 22 comprise corresponding handling elements 4. Larger distances between the handling elements 4 are provided on the right side of the figure, as is the case in the prior art. On the left side, the distances between the individual handling elements 4 are reduced according to the invention. As a result, more support points are provided by the handling elements 4, so that there is less bending of the injection moulding tool plates. In the figure, the bending of the injection moulding tool plates is significantly exaggerated. In fact, the bending is so small that it is barely visible to the naked eye.

FIG. 6 shows a schematic view of two injection moulding tool plates 21, 22 arranged one above the other. Due to the dead weight of the injection moulding tool plates and due to thermal effects, there can be a tilting, i.e. a rotation of one injection moulding tool plate 21 relative to another injection moulding tool plate 22 (shown by a dashed line) about an axis that is perpendicular to the injection moulding tool plates.

In the right part of the figure, the distances between the handling elements are selected so as to be larger than in the left part of the figure. It can be seen that, due to the greater number of handling elements, a less pronounced tilting of the plates towards one another occurs in the left part of the figure.

The measures according to the invention can therefore reduce the bending and tilting of the injection moulding plates.

REFERENCE NUMBERS

1 Injection moulding tool plate
2 Recess
3 Frame members
4 Handling element
11 Neck ring
12 Cavity
13 Region
14 Core
21 Injection moulding tool plate
22 Injection moulding tool plate

The invention claimed is:

1. An injection moulding machine, comprising an injection moulding tool for producing preforms,
wherein the injection moulding tool includes:
a first injection moulding tool plate configured as a core plate;
a second injection moulding tool plate configured as a cavity plate;
a removal plate for removing preforms from the core plate; and
a third injection moulding tool plate configured as an after-treatment plate,
wherein each of the first injection moulding tool plate and the second injection moulding tool plate include a plurality of handling elements arranged in columns and rows, where a distance r1 between adjacent handling elements within the rows is greater than a distance s1 between adjacent handling elements within the columns, where the distance s1 is less than 50 mm,
wherein the cavity plate and the core plate are movable back and forth relative to one another between a closed position and an open position,
wherein, in the closed position, the plurality of handling elements of the core plate configured as cores are inserted into the plurality of handling elements of the cavity plate configured as cavities, whereby moulding spaces are formed between cores on the one hand and cavities on the other hand, where a concave portion of a contour of the moulding spaces corresponds to an outer contour of the preforms to be produced and a convex contour of the moulding spaces corresponds to an inner contour of the preforms to be produced,
wherein the removal plate comprises receiving sleeves,
wherein the removal plate can be moved back and forth between an outer position in which the removal plate is not arranged between the cavity plate and the core plate and at least two removal positions in which the removal plate is arranged between the cavity plate and the core plate,
wherein, in the after-treatment plate, handling elements are removal elements for removing the preforms from the removal plate,
wherein the third injection moulding tool plate has a plurality of handling elements arranged in columns and rows, wherein a distance r2 between adjacent handling elements within the rows is greater than a distance s2 between adjacent handling elements within the columns, wherein the distance s2 is less than 50 mm,
wherein the preforms to be produced by the injection moulding machine are PET preforms,
wherein the injection moulding machine is configured for simultaneous production of a plurality of PET preforms and to apply to the cavity plate and the core plate, when the cavity plate and the core plate are in the closed position, a closing force of less than 30 kN per PET preform,
wherein the injection moulding machine comprises four frame members arranged on four vertices of a rectangle, and the handling elements are arranged between the four frame members,
wherein:
the clearance between two frame members arranged on adjacent vertices of the rectangle is less than 1000 mm, and at least 136 handling elements are arranged on the core plate as well as on the cavity plate,
or
the clearance between two frame members arranged on adjacent vertices of the rectangle is less than 800 mm, and at least 120 handling elements are arranged on the core plate as well as on the cavity plate,
or
the clearance between two frame members arranged on adjacent vertices of the rectangle is less than 750 mm, and at least 88 handling elements are arranged on the core plate as well as on the cavity plate,
wherein each of the first injection moulding tool plate and the second injection moulding tool plate comprises a work surface having a surface content F,
wherein all handling elements are arranged either within the work surface or on a boundary of the work surface, and
wherein a number of handling elements is t and a ratio $$\frac{t}{F} > 190/\mathrm{m}^2.$$

2. The injection moulding machine according to claim 1, wherein the distance r1 is less than 140 mm.

3. The injection moulding machine according to claim 1, wherein a ratio r1/s1 is between 2.4 and 2.8.

4. The injection moulding machine according to claim 1, wherein a row of handling elements is formed by two row groups of handling elements, and
wherein, for a distance z between the row groups of handling elements, the following equation is valid:

$$z = r3\left(1 + \frac{a}{n}\right),$$

wherein r3 stands for a distance of the handling elements within a row group and n,a ∈ IN where n>1.

5. The injection moulding machine according to claim 4, wherein a<n.

6. The injection moulding machine according to claim 4, wherein each row group comprises exactly four handling elements.

7. The injection moulding machine according to claim 1, wherein a column of handling elements is formed by two or three column groups of handling elements, and
   wherein, for a distance zs between the column groups of handling elements, the following equation is valid: $zs \geq 2*s3$, wherein s3 stands for a distance of the handling elements within a column group.

8. The injection moulding machine according to claim 7, wherein one column comprises three column groups, and wherein:
   two column groups each comprise exactly three handling elements and one column group comprises exactly twelve handling elements, wherein the column group having exactly twelve handling elements is arranged between the two column groups having exactly three handling elements each,
   or
   two column groups each comprise exactly four handling elements and one column group comprises exactly eight handling elements,
   or
   two column groups each comprise exactly three handling elements and one column group comprises six handling elements.

9. The injection moulding machine according to claim 1, wherein an average distance s between all adjacent handling elements within the columns is less than 50 mm.

10. The injection moulding machine according to claim 1, wherein an average distance r between all adjacent handling elements within the rows is less than 120 mm.

11. The injection moulding machine according to claim 1, wherein each of the first injection moulding tool plate and the second injection moulding tool plate has a substantially rectangular shape, and
   wherein recesses are provided in the corner regions of each of the first injection moulding tool plate and the second injection moulding tool plate in order to receive frame members of an injection moulding machine.

12. The injection moulding machine according to claim 1, wherein the closing force is greater than 20 kN.

13. The injection moulding machine according to claim 1, wherein a ratio r1/s1 is between 2.4 and 2.5.

* * * * *